US010878562B2

(12) United States Patent
Lohel et al.

(10) Patent No.: US 10,878,562 B2
(45) Date of Patent: Dec. 29, 2020

(54) METHOD FOR DETERMINING THE OVERALL BRIGHTNESS OF AT LEAST ONE OBJECT IN A DIGITAL IMAGE

(71) Applicant: QIAGEN GMBH, Hilden (DE)

(72) Inventors: Maiko Lohel, Hilden (DE); Björn Labitzke, Cologne (DE); Thorsten Zerfass, Mülheim an der Ruhr (DE)

(73) Assignee: Qiagen GmgH, Hilden (DE)

( * ) Notice: Subject to any disclaimer, the term of this patent is extended or adjusted under 35 U.S.C. 154(b) by 44 days.

(21) Appl. No.: 16/060,883

(22) PCT Filed: Dec. 9, 2016

(86) PCT No.: PCT/EP2016/080511
§ 371 (c)(1),
(2) Date: Jun. 8, 2018

(87) PCT Pub. No.: WO2017/098013
PCT Pub. Date: Jun. 15, 2017

(65) Prior Publication Data
US 2019/0012785 A1    Jan. 10, 2019

(30) Foreign Application Priority Data
Dec. 10, 2015 (EP) .................................... 15199404

(51) Int. Cl.
*G06T 7/00* (2017.01)
*G01N 21/64* (2006.01)
(Continued)

(52) U.S. Cl.
CPC ....... *G06T 7/0012* (2013.01); *G01N 21/6456* (2013.01); *G01N 21/6486* (2013.01);
(Continued)

(58) Field of Classification Search
None
See application file for complete search history.

(56) References Cited

U.S. PATENT DOCUMENTS 6,865,325 B2 *  3/2005  Ide ....................... G02B 6/0043
                                                           345/30
7,110,585 B2 *  9/2006  Cork ..................... G01N 21/253
                                                           382/128

(Continued)

FOREIGN PATENT DOCUMENTS

JP            4043018 B2  *  3/2003
WO    WO 2008/097455 A1      8/2008

(Continued)

OTHER PUBLICATIONS

Berrar, Daniel P., Werner Dubitzky, and Martin Granzow, eds. A practical approach to microarray data analysis. New York: Kluwer academic publishers, 2003. (Year: 2003).*
Marsh, R. J., Pfisterer, K., Bennett, P., Hirvonen, L. M., Gautel, M., Jones, G. E., & Cox, S. (2018). Artifact-free high-density localization microscopy analysis. Nature methods, 15(9), 689. (Year: 2018).*

(Continued)

*Primary Examiner* — Andrae S Allison
(74) *Attorney, Agent, or Firm* — Sterne, Kessler, Goldstein & Fox P.L.L.C.

(57) ABSTRACT

The present invention relates to a method and a system for the overall brightness of at least one object in a digital image. In particular, the method for determining the overall brightness of at least one object in a digital image, the at least one object being configured to receive molecules comprising genetic information, the method comprising the steps of: generating an area A comprising k sample points, the k points being distributed in the area A according to a predetermined distribution; aligning the center position of the area A to the center position of the at least one object in the digital image; extracting the intensity value at each of the (Continued)

k sample points; and calculating the central tendency of the extracted intensity values at the respective k sample points.

20 Claims, 2 Drawing Sheets

(51) Int. Cl.
    *G06K 9/00*     (2006.01)
    *G06K 9/46*     (2006.01)
    *G06T 3/00*     (2006.01)

(52) U.S. Cl.
    CPC ............ *G06K 9/0014* (2013.01); *G06K 9/46* (2013.01); *G06T 3/0075* (2013.01); *G06T 2207/10064* (2013.01); *G06T 2207/30072* (2013.01)

(56) References Cited

U.S. PATENT DOCUMENTS

| | | | |
|---|---|---|---|
| 7,214,492 B1 * | 5/2007 | Rublee ................. | C12Q 1/6837 435/283.1 |
| 7,387,876 B2 * | 6/2008 | Church ................ | C12Q 1/6846 435/6.1 |
| 8,048,623 B1 * | 11/2011 | Rublee ................. | C12Q 1/6888 435/287.2 |
| 9,126,165 B1 * | 9/2015 | Rublee ....................... | B01J 8/00 |
| 2003/0068638 A1 * | 4/2003 | Cork .................... | G01N 21/253 435/6.12 |
| 2007/0041624 A1 * | 2/2007 | Cork .................... | G01N 21/253 382/128 |
| 2010/0323350 A1 | 12/2010 | Gordon et al. | |
| 2011/0268347 A1 * | 11/2011 | Staker ...................... | G06K 9/32 382/151 |
| 2019/0187031 A1 * | 6/2019 | Johnson-Buck ..... | C12Q 1/6806 |

FOREIGN PATENT DOCUMENTS

| | | |
|---|---|---|
| WO | WO 2009/117119 A1 | 9/2009 |
| WO | WO 2012/096619 A1 | 7/2012 |
| WO | WO 2014/020137 A1 | 2/2014 |

OTHER PUBLICATIONS

Meruvia-Pastor, Oscar E., et al. "Estimating cell count and distribution in labeled histological samples using incremental cell search." Journal of Biomedical Imaging 2011 (2011): 12. (Year: 2011).*

Babu, M. Madan. "Introduction to microarray data analysis." Conputational genomics: Theory and application 225 (2004): 249. (Year: 2004).*

Pan, Y.A., et al.,"Zebrabow: multispectral cell labeling for cell tracing and lineage analysis in zebrafish", *Development*, vol. 140, No. 13, Jul. 2013, pp. 2835-2846.

International Search Report and Written Opinion of the International Searching Authority directed to related International Patent Application No. PCT/EP2016/080511, dated Jun. 12, 2018; 7 pages.

International Preliminary Report on Patentability directed to related International Patent Application No. PCT/EP2016/080511, dated Aug. 3, 2017; 10 pages.

Bridson, "Fast Poisson Disk Sampling in Arbitrary Dimensions," ACM SIGGRAPH 2007 Sketches, 2007, Article No. 22; 1 page.

Daostorm, "Daostorm: an algorithm for high-density super-resolution microscopy," Nature Methods, Jan. 1, 2011, vol. 8, No. 1, p. 279.

Dunbar et al., "A Spatial Data Structure for Fast Poisson-Disk Sample Generation," 2006 ACM Trans. Graph. 25, 3, 503-508.

"Dynabeads Magnetic Separation Technology," ThermoFisher Scientific; 2 pages.

Cook, "Stochastic sampling in computer graphics," 1986, Graph. 5, 1; 22 pages.

Křížek et al., "Minimizing detection errors in single molecule localization microscopy," Optics Express, Feb. 3, 2011, vol. 19, No. 4, pp. 3226-3235.

Metzker, "Sequencing technologies—the next generation," Nature Reviews Genetics, Jan. 2010, vol. 11, pp. 31-46.

Mighell, Stellar photometry and astrometry with discrete point spread functions, Monthly Notices of the Royal Astronomical Society, Royal Astronomical Society, May 21, 2005, vol. 361, pp. 861-878.

Rees et al., "Elements of image processing in localization microscopy," Journal of Optics, Institute of Physics Publishing, Sep. 10, 2013, vol. 15, No. 9; 7 pages.

Voelkerding et al., Next-Generation Sequencing: From Basic Research to Diagnostics, Clinical Chemistry, Mar. 2009, vol. 55, No. 4, pp. 641-658.

* cited by examiner

METHOD FOR DETERMINING THE OVERALL BRIGHTNESS OF AT LEAST ONE OBJECT IN A DIGITAL IMAGE

The present invention relates to a method and a system for determining the overall brightness of at least one object in a digital image. In particular, the present invention relates to a method and a system for determining the overall brightness of at least one object in a digital image, wherein the at least one object is configured to receive molecules comprising genetic information.

Biotechnology, medicine and related technical fields are based on the analysis of molecules. Electronic devices can analyse molecules with high precision and specificity. Especially in the last years, automated electronic devices have been developed for analysing large numbers of samples by routine methods. For example, modern DNA sequencing apparatus are used for routine analysis of large numbers of DNA probes. Protein samples can be analysed by high throughput screening and related methods. Frequently, such electronic devices detect fluorescent signals emitted from the sample probes. This is possible when molecules, such as nucleic acids or proteins, have been labelled with fluorescent compounds such as dyes.

Commercially available sequencing apparatus are capable of sequencing large numbers of samples labelled with fluorescent dyes in parallel. Recently developed methods, referred to as "next-generation sequencing", NGS, have revolutionized sequencing. NGS allows the massively parallel sequencing of clonally amplified or single DNA molecules that are spatially separated in a flow cell or by generation of an oil-water emulsion. NGS allows thousands or even millions to billions of sequencing reactions to be performed simultaneously.

In NGS, sequencing is performed by repeated cycles of polymerase-mediated nucleotide extensions or, in one format, by iterative cycles of oligonucleotide ligation. As a massively parallel process, NGS generates hundreds of megabases to gigabases of nucleotide-sequence output in a single instrument run, depending on the platform. The inexpensive production of large volumes of sequence data is the primary advantage over conventional methods. NGS platforms and common applications/fields for NGS technologies are e.g. reviewed in Voelkerding et al, Clinical Chemistry 55:4 641-658, 2009 and Metzker, Nature Reviews/Genetics Volume 11, January 2010, pages 31-46.

In NGS, various oligonucleotides of interest are covalently attached to a support. Subsequently, a nucleotide labelled with a fluorescent dye is attached to the growing oligonucleotide chain with DNA polymerase. When the four nucleotides are labelled with different fluorescent dyes, fluorescent signals emitted from a probe can be detected and the type of nucleotide attached to the oligonucleotide can be identified. After detection, the fluorescent dye is cleaved off and the next synthesis cycle is carried out, in which a new labelled nucleotide is attached to the growing chain. By carrying out multiple cycles, the sequence of a growing oligonucleotide chain can be determined in a stepwise manner. The working steps are carried out in an automated sequencing apparatus.

US 2010/0323350 A1 and WO 2009/117119 A1 relate to methods and compositions for determining the identity of nucleic acids in nucleotide sequences using, for example, data obtained from sequencing by synthesis methods.

WO 2008/097455 A1 relates to an imaging system for exciting and measuring fluorescence on or in samples comprising fluorescent materials, e.g. fluorescent labels, dyes or pigments, in particular to detect fluorescent labels on nucleic acid. Moreover, a device is disclosed being configured such that fluorescent labels in a plurality of different DNA templates are simultaneously detected.

WO 2014/020137 A1 relates to a method for enriching target sequences from a sequencing library to provide a target enriched sequencing library, wherein the sequencing library is suitable for massive parallel sequencing and comprises a plurality of double-stranded nucleic acid molecules.

Fluorescent signals emitted from sample probes with labelled molecules are weak, but the signals have to be detected with high precision and specificity. Thus, precise optical equipment, especially cameras and scanning technology, is required for such processes.

In addition, extensive evaluation of the digital images captured by an optical imaging system of the sequencing apparatus is necessary for obtaining a precise and reliable result of the sequencing, e.g. in FASTQ.

In a sequencing apparatus, digital images of the flow cell of the sequencing apparatus or parts of the flow cell of the sequencing apparatus strongly depend on the characteristics of the optical imaging system used for capturing digital images. Moreover, when the at least one object being configured to receive molecules is a so-called bead, which is configured to receive DNA or RNA on its surface, the spherical beads in the digital image and the square pixels show different shapes and the intensity of a bead has to be formulated as a function of the brightness of one or more pixels. Moreover, slight distortion effects in the optical imaging system, e.g. caused by the vignetting effect, further stresses the need of determining the overall brightness of a pixel set that jointly represents a particular bead. Moreover, besides the fact that spherical beads and image pixels have different shapes, which has to be taken into account, the intensity extraction of the respective pixels also have to compensate slight inaccuracies of the image alignment process, i.e. the alignment of the sub-pixel precise bead-positions and the corresponding fluorescence image.

It is an object of the invention to provide a method and a system for determining the overall brightness of at least one object in a digital image, particularly the overall brightness of at least one object in digital image, wherein the at least one object is configured to receive molecules comprising genetic information. The method according to the present invention is computer-implemented. However, it is understood by the skilled person that there are also other ways of implementing the method according to the present invention.

This object is achieved by a method and a system according to the independent claims. Dependent patent claims refer to preferred embodiments.

The present invention relates to a method for determining the overall brightness of at least one object in a digital image. The at least one object is configured to receive molecules comprising genetic information. The method comprises the step of generating an area A comprising k sample points, the k points being distributed in the area A according to a predetermined distribution. The method further comprises the step of aligning the center position of the area A to the center position of the at least one object in the digital image. The method further comprises the step of extracting the intensity value at each of the k sample points. The method further comprises the step of calculating the central tendency of the extracted intensity values at the respective k sample points.

Preferably, the above discussed steps of the method according to the present invention are executed in the order as presented above.

Preferably, the step of aligning the center position of the area A to the center position of the at least one object in the digital image is performed by an affine transformation, more preferably by a linear transformation, i.e. a translation.

Preferably, the at least one object is a bead preferably being configured to receive DNA and/or RNA.

Preferably, the generated area A has the shape of the at least one object in the digital image. For example, if the at least one object has for example the shape of a cube in real life, i.e. in 3D, it has the shape of a rectangle in the digital image, i.e. in its 2D representation. Therefore, the generated area A has preferably also the shape of a rectangle.

Preferably, the area A has the size of the at least one object in the digital image multiplied with a factor s1. Preferably, the size of the at least one object is the size of the area of the at least one object in the digital image.

Preferably, the at least one object has the shape of a first disk in the digital image having a diameter d1. Preferably, d1 is 2.8 pixels.

Preferably, the generated area A has the shape of a second disk having a diameter d2. Preferably, d2 is 3 pixels.

Preferably, if the at least one object has the shape of a first disk in the digital image having a diameter d1, the generated area A has the shape of a second disk. Preferably, d1=d2. For example, if the at least one object has a spherical shape in real life, i.e. in 3D, it has the shape of a first disk in the digital image, i.e. in its 2D representation. Therefore, the generated area A has also preferably the shape of the disk, i.e. of a second disk.

Preferably the number of sample points k is smaller or equal k 30, preferably k≤30, preferably k=27. However, it is understood by the skilled person that the number of sample points k is not restricted to 30 or less.

Preferably, the predetermined distribution is blue noise. An example for blue noise is given, for example in references [1], [2], or [3].

Preferably, the k sample points are generated using Poisson disk sampling. An example of Poisson disk sampling is shown in reference [1].

Preferably, the intensity value of the digital image at each of the k sample points is extracted using a bilinear interpolation of the intensity value at the sub-pixel position of each of the k sample points.

Preferably, the central tendency of the extracted intensity values of the respective k sample points is calculated by calculating the median value of the extracted intensity values of the respective k sample points.

Preferably, the at least one object is configured to carry a fluorescent compound. Preferably, the digital image is obtained by an optical imaging system during emission of electromagnetic radiation by the fluorescent compound.

As an alternative, the digital image may also be obtained by an optical imaging system during reflective illumination, preferably during reflective white-light illumination.

The present invention also relates to a computer program product comprising one or more computer readable media having computer executable instructions for performing the steps of the method of one of the preceding claims.

The present invention also relates to a system for determining the overall brightness of an object in a digital image.

Preferably, the at least one object is configured to receive molecules comprising genetic information.

Preferably, the system is configured to carry out the steps of any of the methods according to any of the preceding claims.

The system according to the present invention comprises a generation unit being configured to generate an area A comprising k sample points, the k points being distributed in the area A according to a predetermined distribution.

The system according to the present invention further comprises an aligning unit configured to align the center position of the area A to the center position of the at least one object in the digital image.

The system according to the present invention further comprises an extracting unit configured to extract the intensity value at each of the k sample points.

The system according to the present invention further comprises a calculating unit configured to calculate the central tendency of the extracted intensity values at the respective k sample points.

The present invention will be explained in more detail in the following with reference to preferred exemplary embodiments and with reference to the attached drawings, in which.

Figure 1:
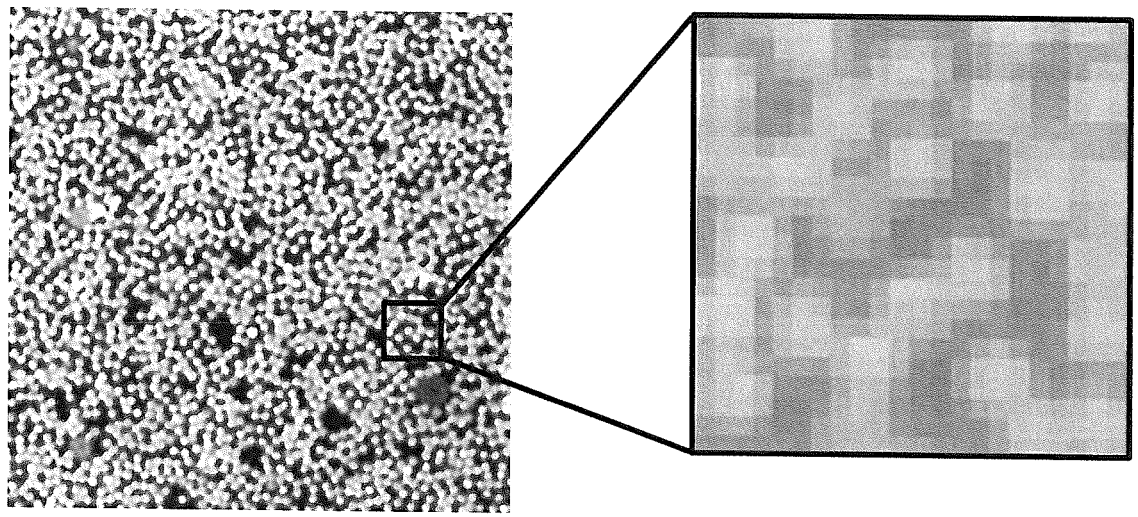
FIG. 1 shows an exemplary fluorescence image as well as an amplified section thereof.

FIG. 1 shows on the left side an exemplary digital image representing a so-called fluorescence image, i.e. a digital image being obtained using an optical imaging system during emission of a fluorescent compound carried by a number of beads. The beads are objects which are configured to receive DNA or RNA. Such beads are commercially available e.g. from Thermo Fisher Scientific Inc., e.g. under the brand Dynabeads, see reference [4]. The right side of FIG. 1 shows an exemplary amplified section of the exemplary fluorescence image of the left side of FIG. 1. The encircled part of the amplified section shows the position of a bead which has been determined by a method known in the art. In this embodiment, the size of the bead is approximately 2.8 pixels.

Figure 2:
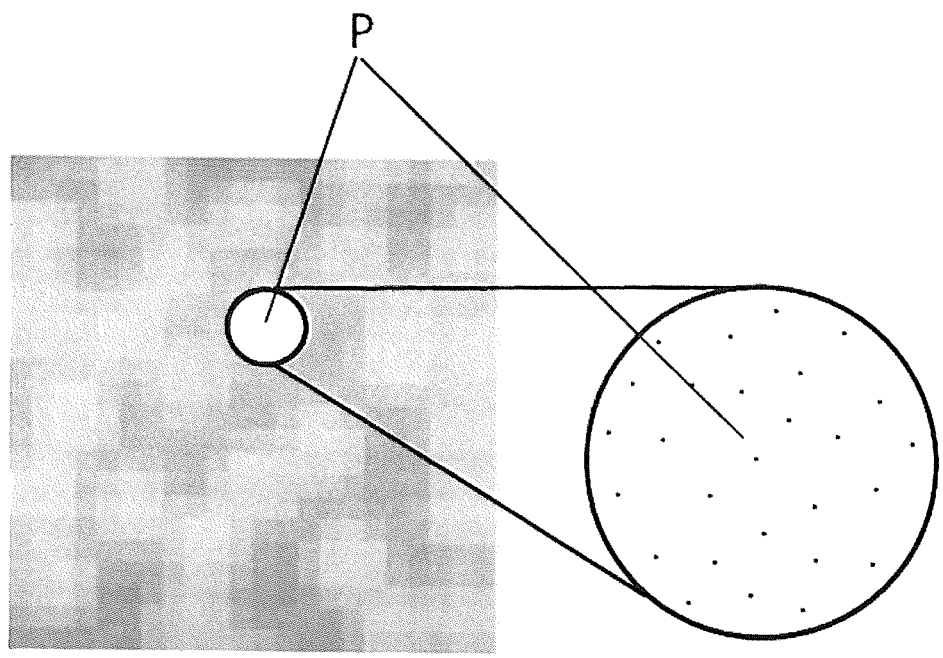
FIG. 2 shows the amplified section of the fluorescence image as shown in FIG. 1 with a Poisson disk P aligned with a bead-position according to a preferred embodiment of the invention.

FIG. 2 shows the amplified section of the fluorescence image as shown on the right side of FIG. 1 with a Poisson disk P aligned with a bead-position according to a preferred embodiment of the invention.

The Poisson disk P has a diameter being slightly larger than the diameter of the bead, i.e. 3 pixels in this preferred embodiment.

The Poisson disk P is generated using the algorithm as presented in reference [1]. The Poisson disk P comprises k sample points each having a minimum distance R from each other, wherein the parameter R is a user-defined density parameter in the algorithm as described in reference [1]. Using this algorithm, a blue noise distribution is created in the Poisson disk P. In other words, the k points are distributed in the Poisson disk P with a blue noise distribution. The Poisson disk P is created not only for this bead but can be used for determining the brightness of all beads/bead-positions in the whole digital image. It is even possible and understood by the skilled person that the so generated Poisson disk P can also be used to determine the brightness for one or more bead-positions in other digital images. In other words, the Poisson disk P can be generated once and can then be used for various bead-positions in various images.

In a next step, the Poisson disk is aligned with the bead-position. In other words, the centre of the Poisson disk is aligned with the centre of the bead-position.

In a next step, at each sample point the intensity value is extracted. The extraction of the intensity value at the position of the sample point is extracted using bilinear interpolation thus resulting in a bilinear intensity extraction.

Figure 3:
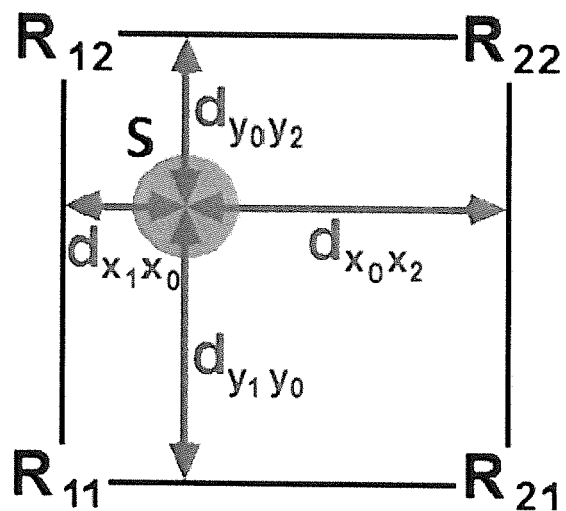
FIG. 3 shows an exemplary bilinear-interpolation to extract the intensity values at the sample points k of the Poisson disk P according to a preferred embodiment of the present invention.

The bilinear interpolation to extract the intensity values at the sample points k of the Poisson disk P according to a preferred embodiment of the present invention is exemplarily shown with reference to FIG. 3. In FIG. 3, a sample point, denoted as "S" lies within a pixel at the sub-pixel precise position $S(x_0, y_0)$.

In FIG. 3,
$S=(x_0, y_0)$ denotes the two-dimensional sub-pixel precise position of the sample point S,
$R_{11}=(x_1, y_1)$ denotes the bottom left neighboring pixel,
$R_{21}=(x_2, y_1)$ denotes the bottom right neighboring pixel,
$R_{12}=(x_1, y_2)$ denotes the top left neighboring pixel, and
$R_{22}=(x_2, y_2)$ denotes the top right neighboring pixel.
Furthermore, the following definitions apply
$x_1=\lceil x_0 \rceil$, $y_1=\lceil y_0 \rceil$
$x_2=\lfloor x_0 \rfloor$, $=\lfloor y \rfloor$.
Against this background, the following equations need to be defined:

$$d_{x_1 x_0} = \frac{x_2 - x_0}{x_2 - x_1}$$

$$d_{x_0 x_2} = \frac{x_0 - x_1}{x_2 - x_1}$$

$$d_{y_1 y_0} = \frac{y_2 - y_0}{y_2 - y_1}$$

$$d_{y_0 y_2} = \frac{y_0 - y_1}{y_2 - y_1}.$$

Considering, that the total length of a pixel is 2, the abovementioned equations can be simplified as follows:

$$d_{x_1 x_0} = x_2 - x_0$$

$$d_{x_0 x_2} = x_0 - x_1$$

$$d_{y_1 y_0} = y_2 - y_0$$

$$d_{y_0 y_2} = y_0 - y_1.$$

Hence, the intensity can be derived as a bilinear interpolation:

$$i_{id} = (d_{x_1 x_0} * I(x_{R_{12}}, y_{R_{12}}) + d_{x_0 x_2} * I(x_{R_{22}}, y_{R_{22}})) * d_{y_0 y_2} + (d_{x_1 x_0} * I(x_{R_{11}}, y_{R_{11}}) + d_{x_0 x_2} * I(x_{R_{21}}, y_{R_{21}})) * d_{y_1 y_0}$$

where
$I(x,y)$:=brightness of the pixel located at (x,y) in the image,
$i_{id}$:=intensity value of the sample point S
In such a manner, the intensity value for each sample point S of the k sample points is determined.

In a next step, a median filtering over the k sample points is applied thus resulting in an intensity value for the whole Poisson disk and for the whole bead respectively. In other words, the overall brightness of the bead can be determined in that way.

Figure 4:
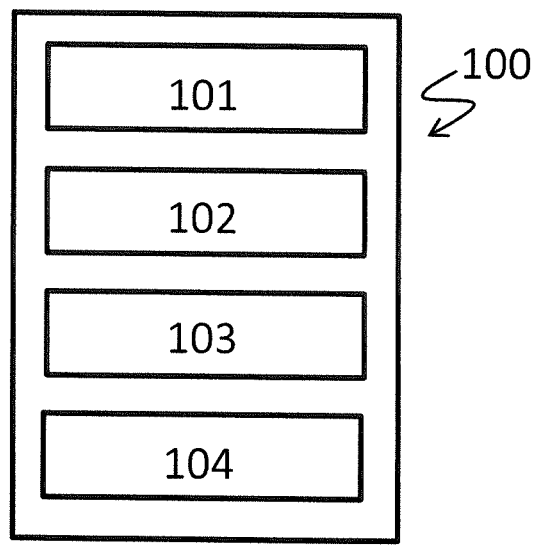
FIG. 4 shows a system for determining the overall brightness of at least one object in the digital image according to a preferred embodiment of the present invention.

FIG. 4 shows a system 100 for determining the overall brightness of at least one object in the digital image according to a preferred embodiment of the present invention.

In general, the system 100 is configured to carry out the method steps as discussed above.

The system 100 comprises a generation unit 101 which generates an area A comprising k sample points, the k points being distributed in the area A according to a blue noise distribution. In other words, the generation unit 101 is configured to generate a Poisson disk P comprising k sample points.

After the generation of the Poisson disk P, an aligning unit 102 of the system 100 aligns the center position of the Poisson disk P to the center position of a bead in the digital image.

Thereafter, an extracting unit 103 extracts the intensity value of each of the k sample points.

After extracting the intensity values of the k sample points, a calculating unit 104 of the system 100 calculates the median of the extracted intensity values at the respective k sample points thus resulting in the overall brightness of the bead.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

REFERENCES

[1]—Bridson, R., "Fast Poisson Disk Sampling in Arbitrary Dimensions", ACM SIGGRAPH 2007 Sketches", 2007, Article No. 22.
[2]—Dunbar, D. et al., "A spatial data structure for fast Poisson-disk sample generation", 2006 ACM Trans. Graph. 25, 3, 503-508.
[3]—Cook, R. L., "Stochastic sampling in computer graphics", ACM Trans. Graph, 5, 1986
[4] www.thermofisher.com/de/de/home/brands/product-brand/dynal.html

The invention claimed is:

1. A computer implemented method for determining an overall brightness of at least one object in a digital image, the at least one object being configured to receive molecules comprising genetic information, the method comprising:
generating an area A comprising k sample points, the k sample points being distributed in the area A according to a predetermined distribution;
aligning a center position of the area A to a center position of the at least one object in the digital image;
extracting an intensity value at each of the k sample points; and
calculating a central tendency of the extracted intensity values at the respective k sample points.

2. The method according to claim 1, wherein the area A has a shape of the at least one object in the digital image.

3. The method according to claim 1, wherein the area A has a size of the at least one object in the digital image multiplied with a factor.

4. The method according to claim 1, wherein the at least one object is a bead configured to receive DNA or RNA.

5. The method according to claim 1, wherein the at least one object has a shape of a first disk in the digital image having a diameter of approximately 2.8 pixels.

6. The method according to claim 1, wherein the area A has a shape of a second disk having a diameter of approximately 3 pixels.

7. The method according to claim 1, wherein k sample points are less than or equal to 30.

8. The method according to claim 1, wherein the predetermined distribution is a blue noise.

9. The method according to claim 1, wherein the k sample points are generated using Poisson disk sampling.

10. The method according to claim 1, wherein the intensity value of the digital image at each of the k sample points is extracted using a bilinear interpolation of the intensity value at a sub-pixel position of each of the k sample points.

11. The method according to claim 1, wherein the central tendency of the extracted intensity values of the respective k sample points is calculated by calculating a median value of the extracted intensity values of the respective k sample points.

12. A non-transitory computer readable medium having instructions stored thereon that, when executed by at least one computing device, cause the at least one computing device to perform operations comprising:
    generating an area A comprising k sample points, the k samples points being distributed in the area A according to a predetermined distribution;
    aligning a center position of the area A to a center position of at least one object in a digital image;
    extracting an intensity value at each of the k sample points; and
calculating a central tendency of the extracted intensity values at the respective k sample points.

13. The non-transitory computer readable medium according to claim 12, wherein the area A has a shape of the at least one object in the digital image, the area A has a size of the at least one object in the digital image multiplied with a factor, and the at least one object is a bead configured to receive DNA or RNA.

14. The non-transitory computer readable medium according to claim 12, wherein the at least one object has a shape of a first disk in the digital image having a diameter of approximately 2.8 pixels, and the k sample points are less than or equal to 30.

15. The non-transitory computer readable medium according to claim 12, wherein the predetermined distribution is a blue noise, and the k sample points are generated using Poisson disk sampling.

16. The non-transitory computer readable medium according to claim 12, wherein the intensity value of the digital image at each of the k sample points is extracted using a bilinear interpolation of the intensity value at a sub-pixel position of each of the k sample points, and the central tendency of the extracted intensity values of the respective k sample points is calculated by calculating a median value of the extracted intensity values of the respective k sample points.

17. A system for determining an overall brightness of at least one object in a digital image, the at least one object being configured to receive molecules comprising genetic information, wherein the system comprises:
    a generation unit configured to generate an area A comprising k sample points, the k sample points being distributed in the area A according to a predetermined distribution;
    an aligning unit configured to align a center position of the area A to a center position of the at least one object in the digital image;
    an extracting unit configured to extract an intensity value at each of the k sample points; and
    a calculating unit configured to calculate a central tendency of the extracted intensity values at the respective k sample points.

18. The system according to claim 17, wherein the area A has a shape of the at least one object in the digital image, the area A has a size of the at least one object in the digital image multiplied with a factor, and the at least one object is a bead configured to receive DNA or RNA.

19. The system according to claim 17, wherein the at least one object has a shape of a first disk in the digital image having a diameter of approximately 2.8 pixels, and the k sample points are less than or equal to 30.

20. The system according to claim 17, wherein the intensity value of the digital image at each of the k sample points is extracted using a bilinear interpolation of the intensity value at a sub-pixel position of each of the k sample points, and the central tendency of the extracted intensity values of the respective k sample points is calculated by calculating a median value of the extracted intensity values of the respective k sample points.

* * * * *